US010922219B2

(12) United States Patent
Iida et al.

(10) Patent No.: US 10,922,219 B2
(45) Date of Patent: Feb. 16, 2021

(54) A/B TEST APPARATUS, METHOD, PROGRAM, AND SYSTEM

(71) Applicant: Sony Corporation, Tokyo (JP)

(72) Inventors: Hiroshi Iida, Tokyo (JP); Norifumi Kikkawa, Tokyo (JP)

(73) Assignee: SONY CORPORATION, Tokyo (JP)

(*) Notice: Subject to any disclaimer, the term of this patent is extended or adjusted under 35 U.S.C. 154(b) by 129 days.

(21) Appl. No.: 16/306,583

(22) PCT Filed: Jul. 25, 2017

(86) PCT No.: PCT/JP2017/026764
§ 371 (c)(1),
(2) Date: Dec. 3, 2018

(87) PCT Pub. No.: WO2018/030136
PCT Pub. Date: Feb. 15, 2018

(65) Prior Publication Data
US 2019/0138435 A1 May 9, 2019

(30) Foreign Application Priority Data
Aug. 8, 2016 (JP) .................. 2016-155566

(51) Int. Cl.
G06F 16/00 (2019.01)
G06F 12/02 (2006.01)
(Continued)

(52) U.S. Cl.
CPC .............. *G06F 12/02* (2013.01); *G06F 16/27* (2019.01); *G06Q 30/02* (2013.01); *G06Q 30/06* (2013.01)

(58) Field of Classification Search
CPC combination set(s) only.
See application file for complete search history.

(56) References Cited

U.S. PATENT DOCUMENTS 6,993,748 B2 * 1/2006 Schaefer ............. G06F 11/3664
707/999.003
10,616,294 B2 * 4/2020 Shribman .......... H04N 21/6125
(Continued)

FOREIGN PATENT DOCUMENTS

JP 2011-257913 A 12/2011
JP 2015-225361 A 12/2015
(Continued)

OTHER PUBLICATIONS

English-language translation of International Search Report and Written Opinion for International Application No. PCT/JP2017/026764, dated Aug. 29, 2017.

*Primary Examiner* — Farhan M Syed
(74) *Attorney, Agent, or Firm* — Xsensus LLP

(57) ABSTRACT

The present disclosure relates to an information processing apparatus, an information processing method, a program and an information processing system capable of executing processing that affects a database. In a case where it is instructed to conduct an A/B test that affects a database, a duplication processing unit executes processing for creating a test database by duplicating the database. In a case where it is instructed to terminate the A/B test, a write-back processing unit executes processing for writing back data of the test database to the original database. At this time, all of a plurality of pieces of data registered in the test database or a specified part of the data is selected and written back. The present technology is, for example, applied to a web system capable of conducting the A/B test.

6 Claims, 20 Drawing Sheets

(51) Int. Cl.
*G06Q 30/02* (2012.01)
*G06Q 30/06* (2012.01)
*G06F 16/27* (2019.01)

(56) References Cited

U.S. PATENT DOCUMENTS

| | | | |
|---|---|---|---|
| 2003/0084429 A1* | 5/2003 | Schaefer | G06F 11/3688 |
| | | | 717/125 |
| 2012/0166483 A1* | 6/2012 | Choudhary | G06F 16/2471 |
| | | | 707/770 |
| 2017/0147656 A1* | 5/2017 | Choudhary | G06F 16/2471 |
| 2020/0006988 A1* | 1/2020 | Leabman | A61B 8/56 |

FOREIGN PATENT DOCUMENTS

| | | | |
|---|---|---|---|
| JP | 2015225361 A | * | 12/2015 |
| JP | 2016-051357 A | | 4/2016 |

* cited by examiner

FIG. 8

TEST DEFINITION INPUT

[{"testcase":[{"ratio":0.1,"target":[],"action":[{"server":"feature1"}]}]

WHETHER OR NOT TEST AFFECTS DB
- ● Yes
- ○ No

DB WHICH NEEDS TO BE DUPLICATED
- ☐ User
- ☑ Product
- ☑ Category
- ☐ Purchase_History
- ☐ Preference

[ TEST START ]   [ CANCEL ]

TEST NAME: New Category

WRITE BACK DATA OF DB TO ACTUAL EXECUTION?

○ WRITE BACK ALL DATA
● WRITE BACK A PART OF DATA  ← 64
○ DISCARD ALL DATA

DB TO BE WRITTEN BACK
☑ Product
☐ Category  ← 65

62 — TEST END          63 — CANCEL

| User ID | Name |
|---|---|
| 1 | Name1 |
| 2 | Name2 |
| 3 | Name3 |

B

| ProductID | CategoryID |
|---|---|
| 1 | [1] |
| 2 | [2] |
| 3 | [3] |

C

| CategoryID | Name |
|---|---|
| 1 | Food |
| 2 | Shoes |
| 3 | Books |

D

| UserID | ProductID |
|---|---|
| 1 | 1 |
| 2 | 2 |
| 2 | 3 |
| 3 | 2 |

E

| UserID | Preference |
|---|---|
| 1 | [0.4, 0.1, 0.2] |
| 2 | [-0.2, 0.1, 1] |
| 3 | [0, 0.3, 0.1] |

| User ID | Name |
|---|---|
| 1 | Name1 |
| 2 | Name2 |
| 3 | Name3 |

B

| ProductID | CategoryID |
|---|---|
| 1 | [1] |
| 2 | [2, 4] |
| 3 | [3] |

C

| CategoryID | Name |
|---|---|
| 1 | Food |
| 2 | Shoes |
| 3 | Books |
| 4 | Trend |

D

| User ID | ProductID |
|---|---|
| 1 | 1 |
| 2 | 2 |
| 2 | 3 |
| 3 | 2 |

E

| User ID | Preference |
|---|---|
| 1 | [0.4, 0.1, 0.2] |
| 2 | [-0.2, 0.1, 1] |
| 3 | [0, 0.3, 0.1] |

| UserID | Name |
|---|---|
| 1 | Name1 |
| 2 | Name2 |
| 3 | Name3 |

B

| ProductID | CategoryID |
|---|---|
| 1 | [1] |
| 2 | [2] |
| 3 | [3] |

C

| CategoryID | Name |
|---|---|
| 1 | Food |
| 2 | Shoes |
| 3 | Books |

D

| UserID | ProductID |
|---|---|
| 1 | 1 |
| 2 | 2 |
| 2 | 3 |
| 3 | 2 |
| 1 | 2 |

E

| UserID | Preference |
|---|---|
| 1 | [0.4, 0.2, 0.2] |
| 2 | [-0.2, 0.1, 1] |
| 3 | [0, 0.3, 0.1] |

| UserID | Name |
|---|---|
| 1 | Name1 |
| 2 | Name2 |
| 3 | Name3 |

B

| ProductID | CategoryID |
|---|---|
| 1 | [1] |
| 2 | [2] |
| 3 | [3] |

C

| CategoryID | Name |
|---|---|
| 1 | Food |
| 2 | Shoes |
| 3 | Books |

D

| UserID | ProductID |
|---|---|
| 1 | 1 |
| 2 | 2 |
| 2 | 3 |
| 3 | 2 |
| 1 | 2 |

E

| UserID | Preference |
|---|---|
| 1 | [0.2, 0.4, 0] |
| 2 | [-0.2, 0.1, 1] |
| 3 | [0, 0.3, 0.1] |

A/B TEST APPARATUS, METHOD, PROGRAM, AND SYSTEM

CROSS-REFERENCE TO RELATED APPLICATIONS

This application is a National Stage Application based on PCT/JP2017/026764 filed on 25 Jul. 2017, and claims priority to Japanese Patent Application No. 2016-155566, filed on 8 Aug. 2016, the entire contents of which being incorporated herein by reference.

TECHNICAL FIELD

The present disclosure relates to an information processing apparatus, an information processing method, a program, and an information processing system, and particularly, to an information processing apparatus, an information processing method, a program, and an information processing system capable of executing processing that affects a database.

BACKGROUND ART

Conventionally, in business transactions, information provision, and the like using the Internet, to measure the number of accesses, a product purchase rate, and the like, an A/B test is used in which two web pages having different patterns are prepared and effects of the web pages are compared by actually making users use the web pages.

In the A/B test, the users can be distributed to the web pages respectively having two patterns, for example, by a method for distributing the users with a conditional branch in a code or a method for distributing the users to implementation and test implementation at a subsequent stage by a proxy server at a preceding stage.

For example, Patent Document 1 discloses a content management device with which a user who owns a plurality of web pages can easily recognize the test result of the A/B test for each web page.

CITATION LIST

Patent Document

Patent Document 1: Japanese Patent Application Laid-Open No. 2011-257913

SUMMARY OF THE INVENTION

Problems to be Solved by the Invention

However, regarding the conventional A/B test, since it has not been assumed that unnecessary data, used for the A/B test, which exists in a database at the time of terminating the A/B test foe written back, it has been difficult to conduct an A/B test that affects the database.

The present disclosure has been made in view of such a situation, and enables to execute processing that affects a database.

Solutions to Problems

An information processing apparatus according to one aspect of the present disclosure includes a duplication processing unit which executes processing for creating a test database by duplicating a database in a case where it is instructed to conduct an A/B test that affects the database and a write-back processing unit which executes processing for writing back data of the test database to the database in a case where it is instructed to terminate the A/B test.

An information processing method or a program according to one aspect of the present disclosure includes steps of executing processing for creating a test database by duplicating a database in a case where it is instructed to conduct an A/B test that affects the database and executing processing for writing back data of the test database to the database in a case where it is instructed to terminate the A/B test.

An information processing system according to one aspect of the present disclosure includes a duplication processing unit which executes processing for creating a test database by duplicating a database in a case where it is instructed to conduct an A/B test that affects the database, a write-back processing unit which executes processing for writing back data of the test database to the database in a case where it is instructed to terminate the A/B test, an implementation server which provides a service by using the database, and a test implementation server which provides a service by using the test database.

In one aspect of the present disclosure, in a case where it is instructed to conduct an A/B test that affects a database, processing for creating a test database by duplicating the database is executed, and in a case where it is instructed to terminate the A/B test, processing for writing back data of the test database to the original database is executed.

Effects of the Invention

According to one aspect of the present disclosure, processing that affects a database can be executed.

BRIEF DESCRIPTION OF DRAWINGS

FIG. 8 is a diagram of an example of a test definition input screen at the time when the A/B test that affects the database is conducted.

FIG. 14 is a diagram of an example of the test completion screen at the time when the A/B test that affects the database is terminated.

FIG. 15 is a diagram of an example of a database.

FIG. 16 is a diagram of an example of a database to which a new category is added.

FIG. 17 is a diagram for explaining a change in a database for actual execution.

FIG. 18 is a diagram for explaining a change in a test database.

MODE FOR CARRYING OUT THE INVENTION

A specific embodiment to which the present technology is applied will be described below in detail with reference to the drawings.

<Exemplary Configuration of Information Processing System>

Figure 1:
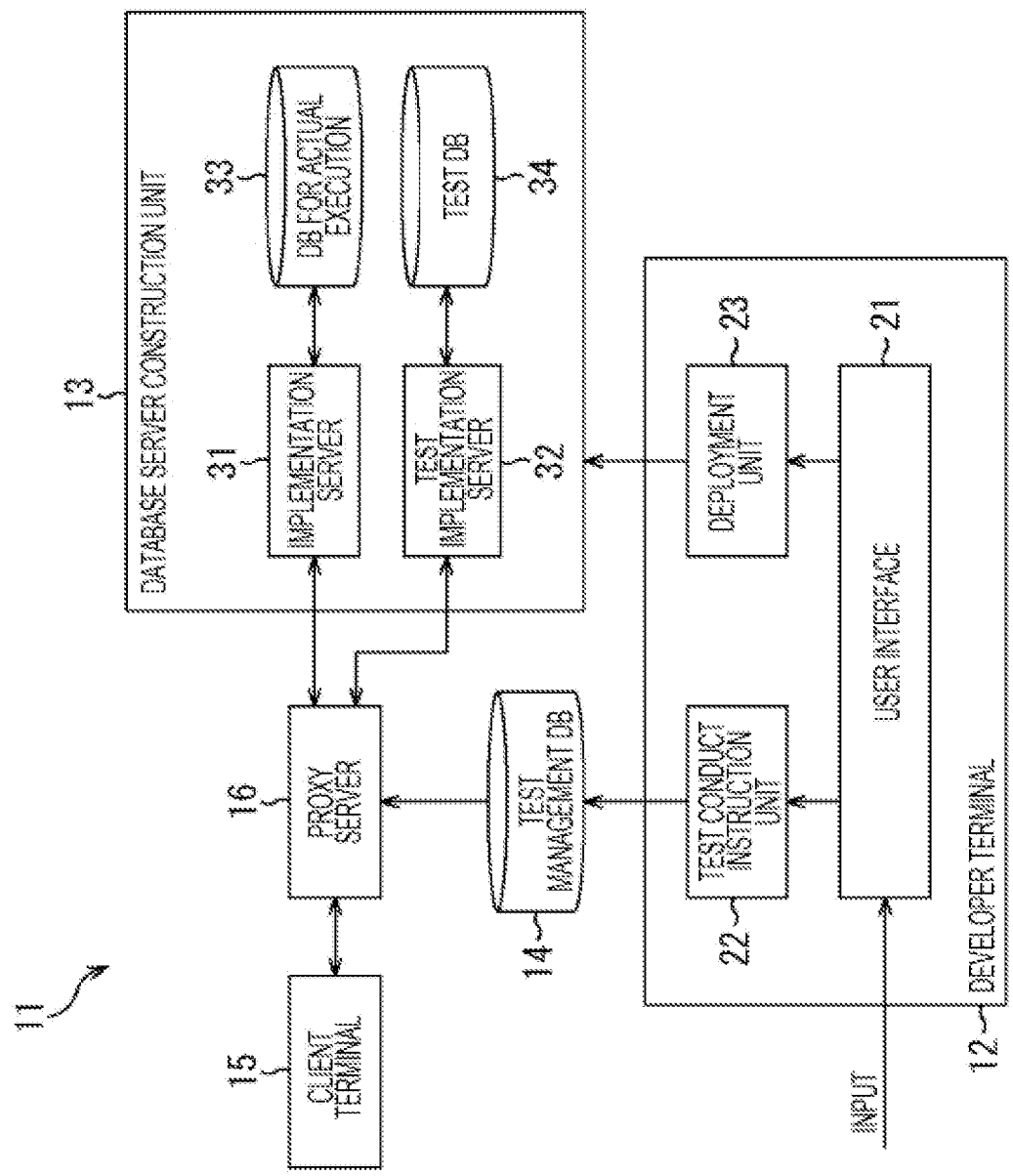
FIG. 1 is a block diagram of an exemplary configuration of an embodiment of an information processing system to which the present technology is applied.

FIG. 1 is a block diagram of an exemplary configuration of an embodiment of an information processing system to which the present technology is applied.

In FIG. 1, an information processing system 11 includes a developer terminal 12, a database server construction unit 13, a test management database 14, a client terminal 15, and a proxy server 16, and these units are connected to each other via a network. The information processing system 11 provides a normal service. In addition, for example, the information processing system 11 can conduct an A/B test using an implementation web page and a web page implemented for a test.

The developer terminal 12 includes a user interface 21, a test conduct instruction unit 22, and a deployment unit 23.

For example, the user interface 21 displays various screens as described later with reference to FIGS. 7 to 14 on a display which is not shown and obtains an input content input by a developer (tester) on the screens.

For example, when a test definition input by the developer using a test definition input screen illustrated in FIGS. 7 and 8 to be described later is supplied from the user interface 21, the test conduct instruction unit 22 registers the test definition to the test management database 14. Then, when the A/B test is started, the test conduct instruction unit 22 instructs the proxy server 16 to start to distribute requests from a user with reference to the test definition registered in the test management database 14.

When the information processing system 11 starts the A/B test, the deployment unit 23 deploys (arrange and develop) a test implementation server 32 and a test database 34 in the database server construction unit 13 and makes the A/B test be conductible. For example, the deployment unit 23 arranges the test database 34 by duplicating data of a database for actual execution 33 of the database server construction unit 13. Furthermore, when the information processing system 11 terminates the A/B test, the deployment unit 23 writes back the data of the test database 34 to the database for actual execution 33 and discards the data of the test database 34.

In the database server construction unit 13, an implementation server 31, the test implementation server 32, the database for actual execution 33, and the test database 34 are constructed. Note that, in FIG. 1, an exemplary configuration of the database server construction unit 13 in a state where the A/B test that affects the database is conducted in the information processing system 11 is illustrated. For example, as described later with reference to FIGS. 2 to 6, the database server construction unit 13 has a different configuration according to a condition of the information processing system 11.

In response to the request from the user, the implementation server 31 executes processing for providing a normal service of the information processing system 11. Furthermore, when the A/B test is conducted by the information processing system 11, the implementation server 31 provides the implementation web page to the user with reference to the database for actual execution 33 in response to the request of the user distributed by the client terminal 15.

When the A/B test is conducted by the information processing system 11, the test implementation server 32 executes processing for providing a service in response to the request of the user distributed by the client terminal 15. For example, the test implementation server 32 provides a test web page to the user with reference to the test database 34.

In the database for actual execution 33, data to be referred when the implementation server 31 executes processing according to the request from the user is registered.

In the test database 34, data to be referred when the test implementation server 32 executes processing according to the request from the user is registered.

In the test management database 14, the test definition to be referred when the proxy server 16 distributes the request of the user to the implementation server 31 and the test implementation server 32 is registered when the A/B test is conducted by the information processing system 11.

The client terminal 15 transmits a request according to an operation of the user to the proxy server 16 and displays a web page provided from the implementation server 31 or the test implementation server 32.

The proxy server 16 executes processing for distributing the request of the user transmitted from the client terminal 15 to the implementation server 31 and the test implementation server 32 according to the test definition registered in the test management database 14.

An exemplary configuration of the database server construction unit 13 will be described with reference to FIGS. 2 to 6.

Figure 2:
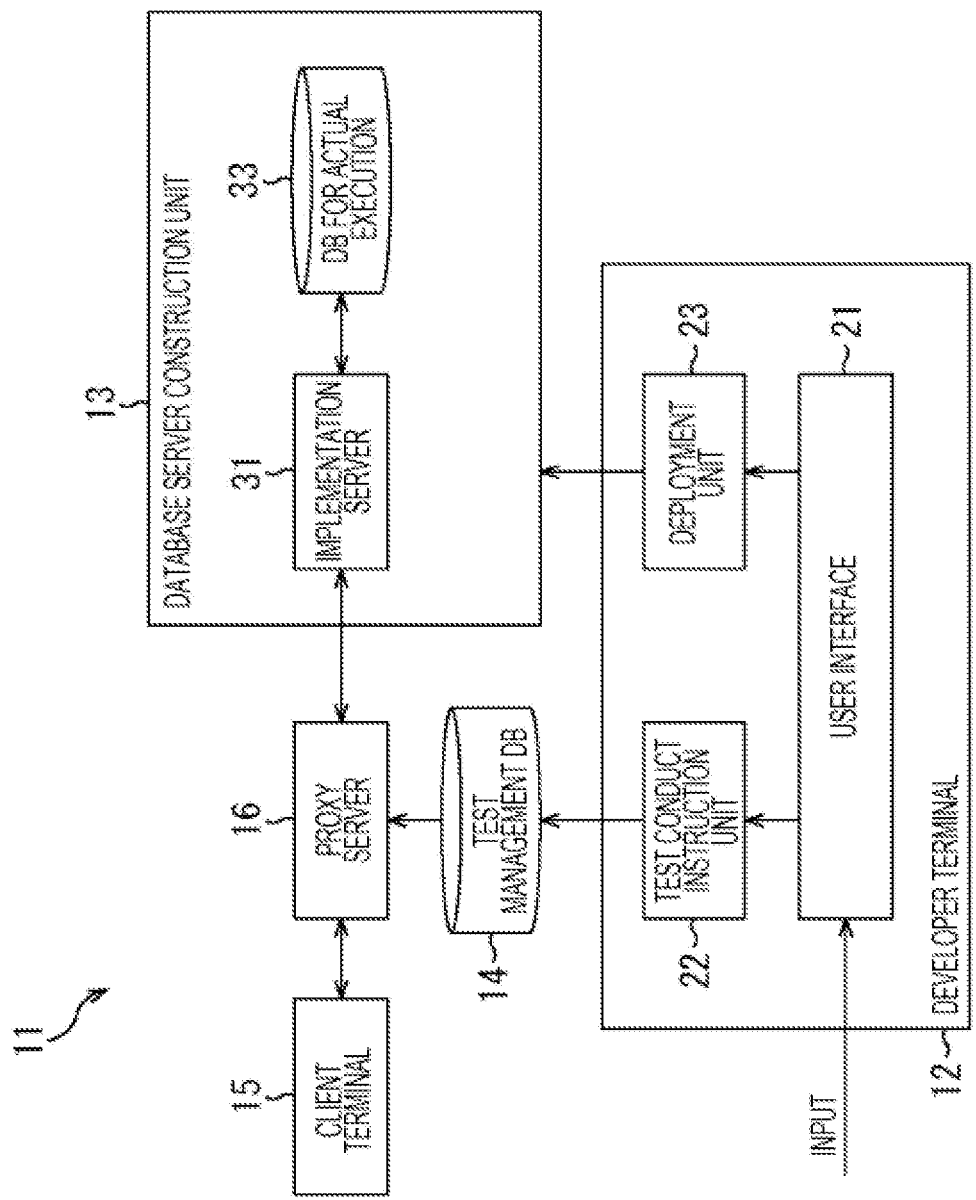
FIG. 2 is a diagram of an exemplary configuration in a state where an A/B test is not conducted.

In FIG. 2, an exemplary configuration in a state where the A/B test is not conducted by the information processing system 11 is illustrated.

As illustrated in FIG. 2, in a state where the A/B test is not conducted by the information processing system 11, that is, when a normal service is provided, the database server construction unit 13 has a configuration in which the implementation server 31 and the database for actual execution 33 are constructed.

Figure 3:
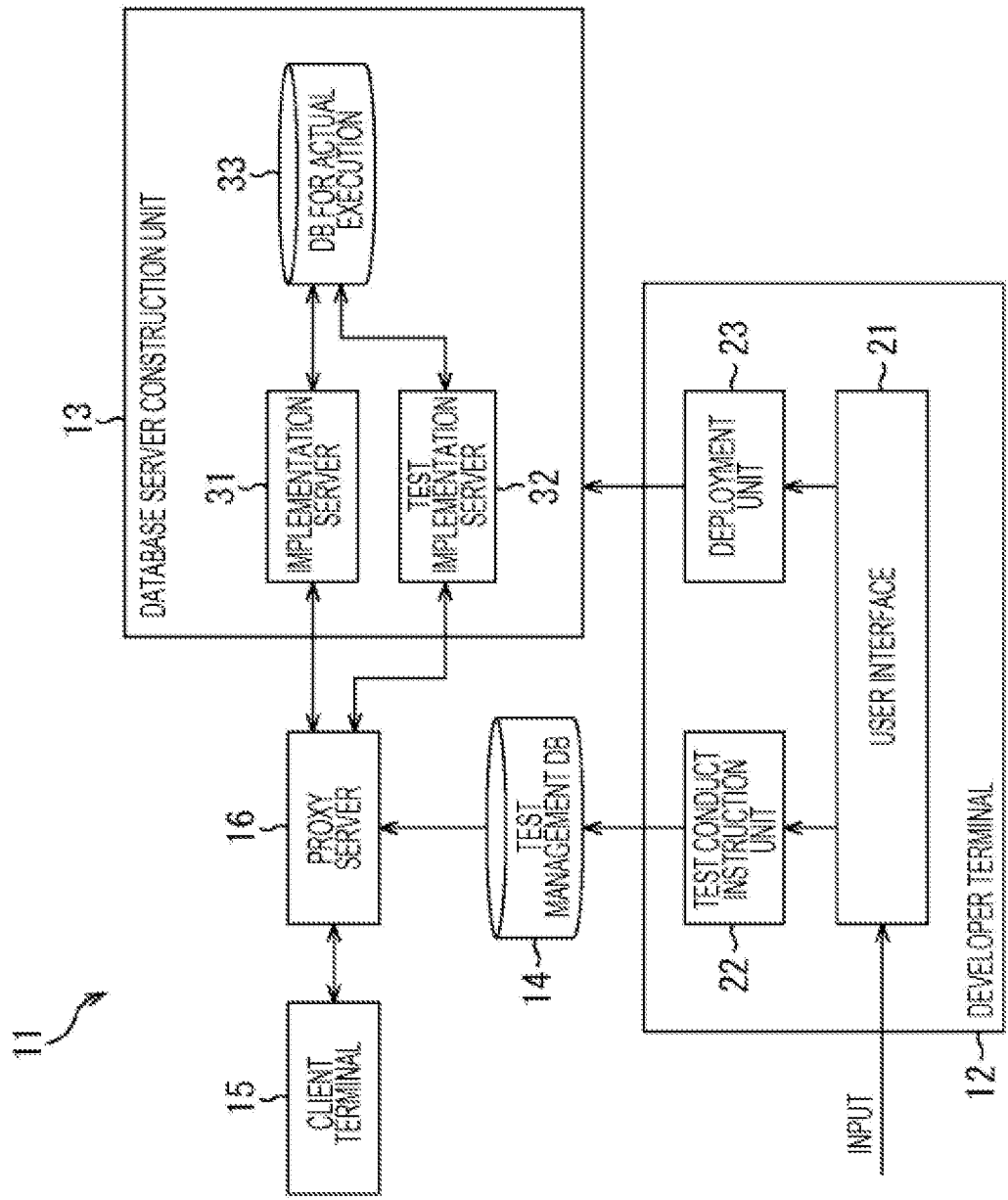
FIG. 3 is a diagram of an exemplary configuration when an A/B test that does not affect a database is conducted.

Then, when the A/B test that does not affect the database is conducted by the information processing system 11, the configuration of the database server construction unit 13 illustrated in FIG. 2 is changed to a configuration in which the test implementation server 32 is deployed by the deployment unit 23 as illustrated in FIG. 3. With this configuration, in the database server construction unit 13, a configuration is constructed in which the implementation server 31 and the test implementation server 32 share the database for actual execution 33.

Figure 4:
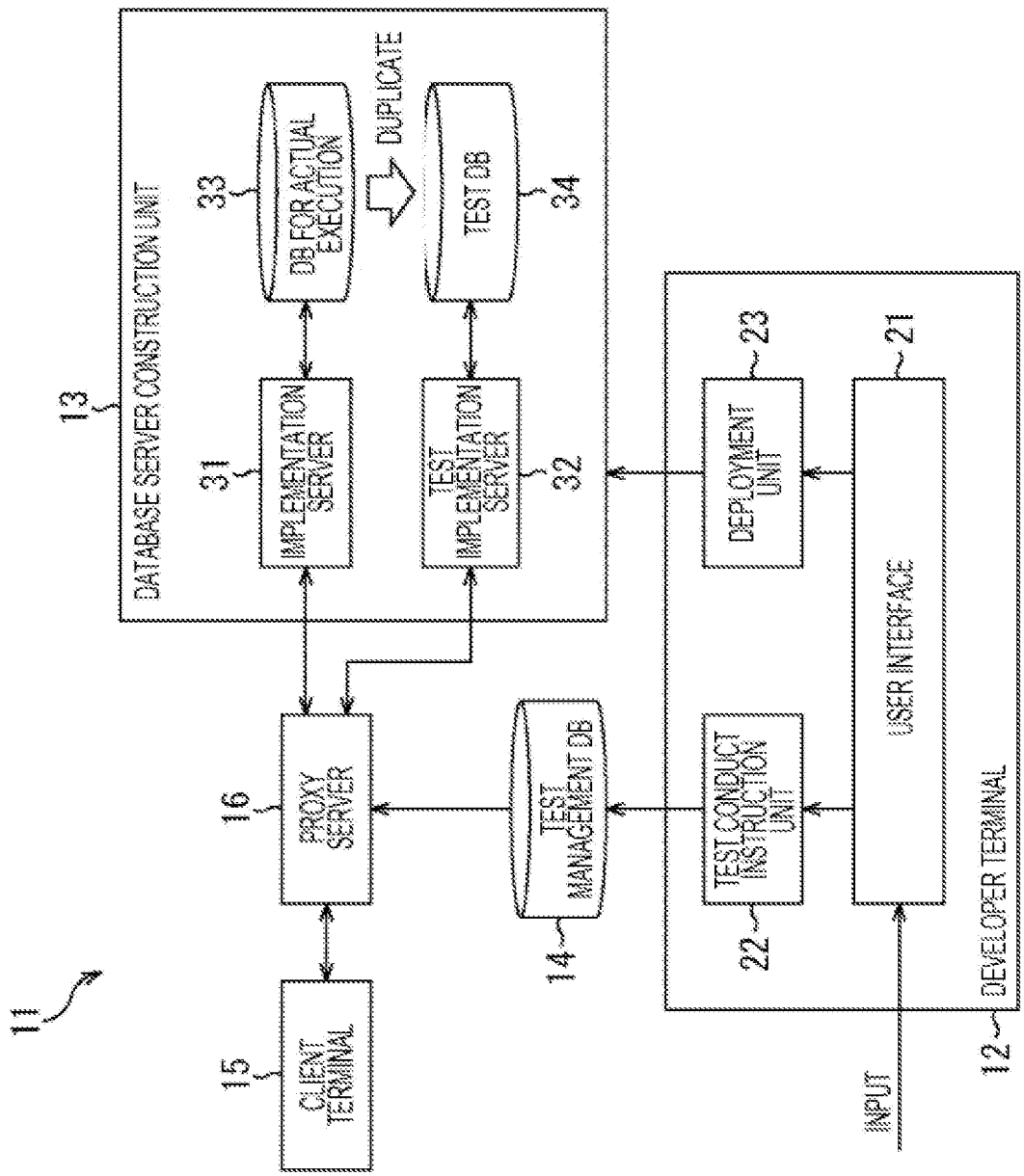
FIG. 4 is a diagram of a state where an A/B test that affects the database is started.

On the other hand, when the A/B test that affects the database is started by the information processing system 11, the configuration of the database server construction unit 13 illustrated in FIG. 2 is changed to a configuration in which the test database 34 is provided by deploying the test implementation server 32 by the deployment unit 23 and further duplicating the database for actual execution 33 as illustrated in FIG. 4. With this configuration, in the database server construction unit 13, a configuration is constructed in which the implementation server 31 uses the database for actual execution 33 and the test implementation server 32 uses the test database 34.

Figure 5:
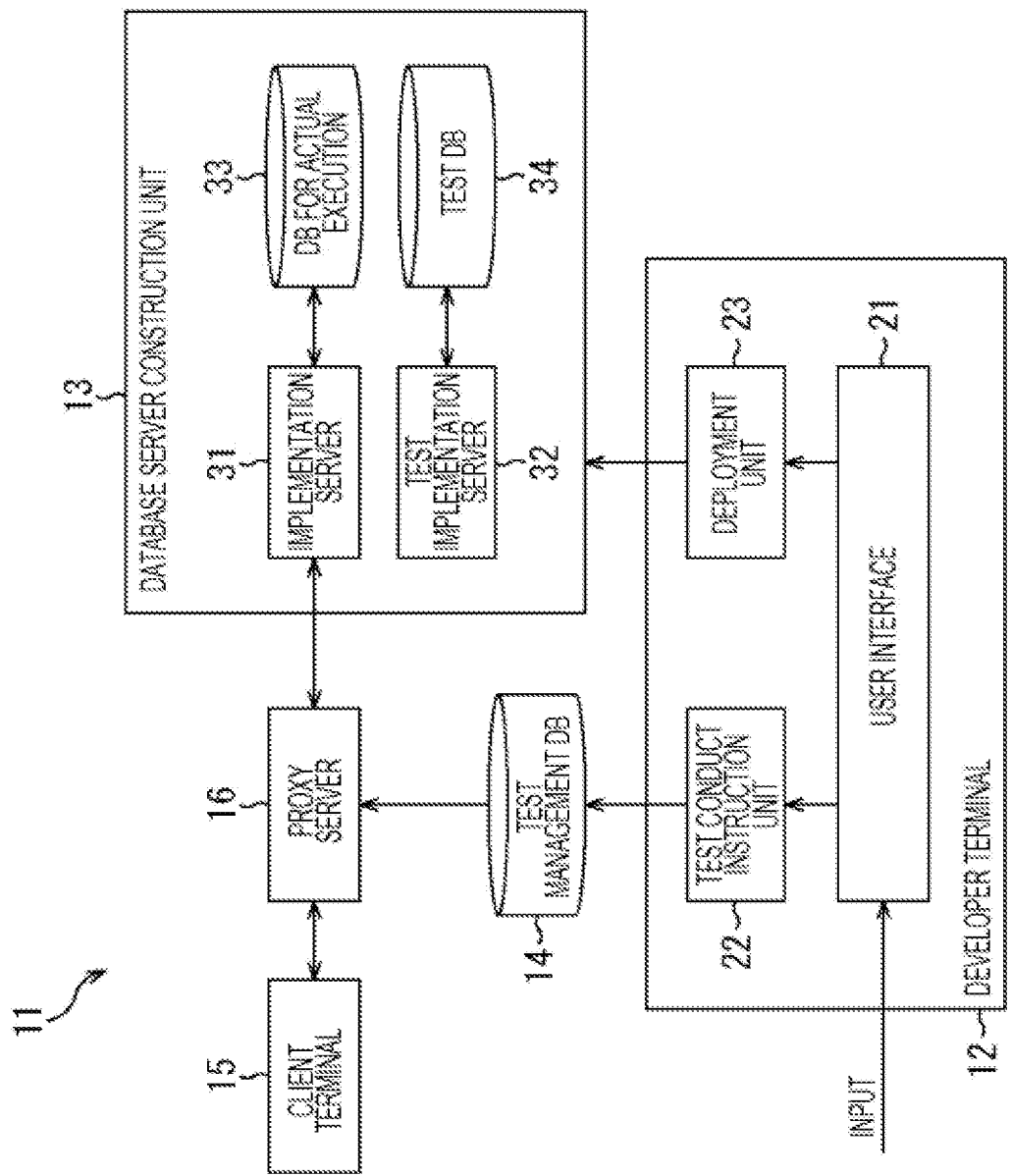
FIG. 5 is a diagram of a state where the A/B test that affects the database is terminated.

Furthermore, when the A/B test that affects the database is terminated by the information processing system 11, as illustrated in FIG. 5, the deployment unit 23 disconnects the test implementation server 32 from the proxy server 16. With this operation, the distribution of the request of the user by the proxy server 16 is stopped.

Figure 6:
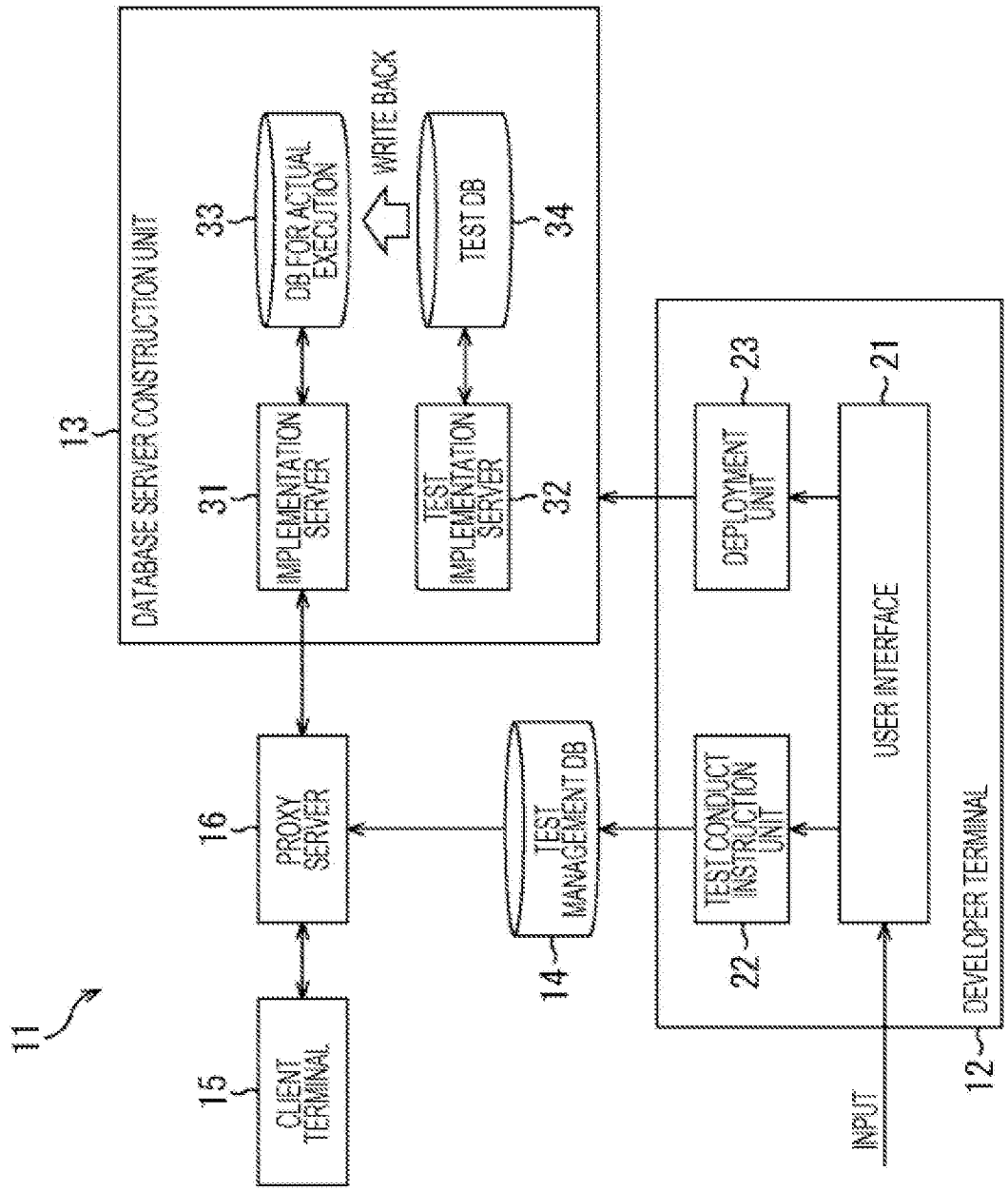
FIG. 6 is a diagram of a state where the A/B test that affects the database is terminated.

Then, as described later, in a case where an excellent result is obtained in the A/B test, as illustrated in FIG. 6, processing for writing back the data of the test database 34 to the database for actual execution 33 is executed. Thereafter, the test implementation server 32 and the test database 34 are deleted by the deployment unit 23, and the database server construction unit 13 has a configuration in which the implementation server 31 and the database for actual execution 33 are constructed as illustrated in FIG. 2.

In this way, the information processing system 11 can conduct the A/B test that affects the database by writing back the data of the test database 34 to the database for actual execution 33.

Hereinafter, for example, an example will be described in which the information processing system 11 provides an Electronic Commerce (EC) service with which a product can be purchased via the Internet.

Regarding the EC service, as the A/B test that does not affect the database, there is a test for confirming whether a change in the purchase of the products occurs according to a change in an appearance of the web page, for example, a change in a size of a purchase button on the web page. Furthermore, regarding the EC service, as the A/B test that affects the database, there is a test for confirming whether a change in the purchase of the product occurs according to the change in the structure of the database, for example, addition of a new category and the like.

<Example of Screen of User Interface>

Various screens used for the user interface 21 will be described with reference to FIGS. 7 to 14.

Figure 7:
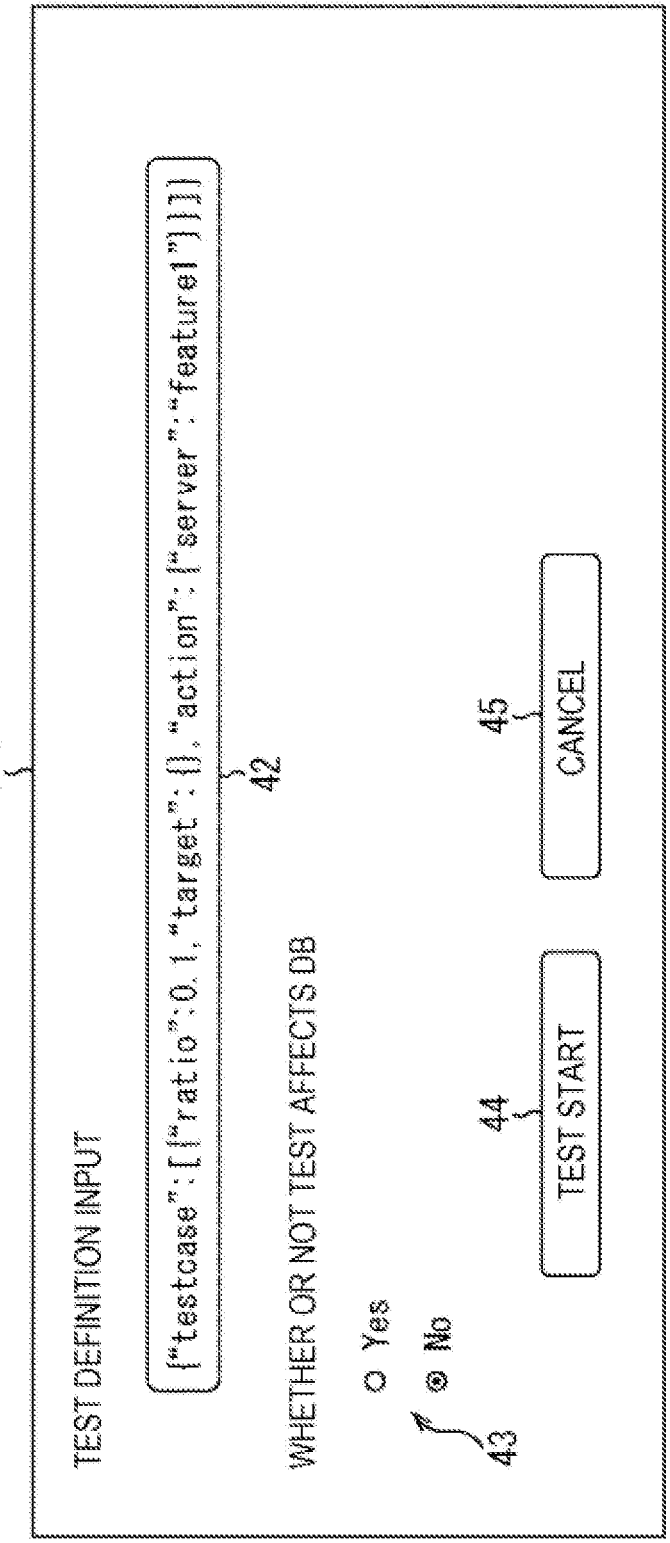
FIG. 7 is a diagram of an example of a test definition input screen at the time when the A/B test that does not affect the database is conducted.

In FIG. 7, an example of a test definition input screen displayed when the test is started is illustrated.

As illustrated in FIG. 7, in a test definition input screen 41a, a test definition input part 42, a radio button 43, a test start button 44, and a cancel button 45 are displayed.

When the Information processing system 11 conducts the A/B test, data to be referred when the proxy server 16 executes processing for distributing the request of the user is input to the test definition input part 42. For example, in FIG. 7, an example of a test definition in which only 10% ("ratio": 0.1) of users who have transmitted the requests is distributed to the test implementation server 32 ("server": "feature1") is illustrated.

Note that, for example, on the basis of a target value input to the test definition input part 42, distribution can be defined according to an attribute of the user so as to distribute 10% of the users such as males ("target": {"sex": "male"}) and developers ("target": {"user_category": "developer"}) to the test implementation server 32.

The radio button 43 is a GUI used to select whether or not the A/B test conducted by the information processing system 11 is an A/B test that affects the database. In the example in FIG. 7, a state where the radio button 43 selects that the A/B test that does not affect the database is illustrated.

The test start button 44 is a GUI which is operated by the developer when the A/B test is started by the information processing system 11.

The cancel button 45 is a GUI which is operated by the developer when an input of an operation through the test definition input screen 41a is cancelled.

In FIG. 8, an example of a test definition input screen at the time when the A/B test that affects the database is conducted is illustrated.

As illustrated in FIG. 8, in a test definition input screen 41b, a state where the radio button 43 selects that the A/B test conducted by the information processing system 11 is the A/B test that affects the database is illustrated. Then, according to the above selection, in the test definition input screen 41b, a check box 46 for designating a database which needs to be duplicated is displayed.

In the example of the test definition input screen 41b in FIG. 8, as the database which needs to be duplicated, a user (User), a product (Product), a product's category (Category), a user's purchase history (Purchase_History), and a preference (Preference) can be selected. Then, a state is illustrated in which Product and Category are indicated by the check boxes 46.

Figure 9:
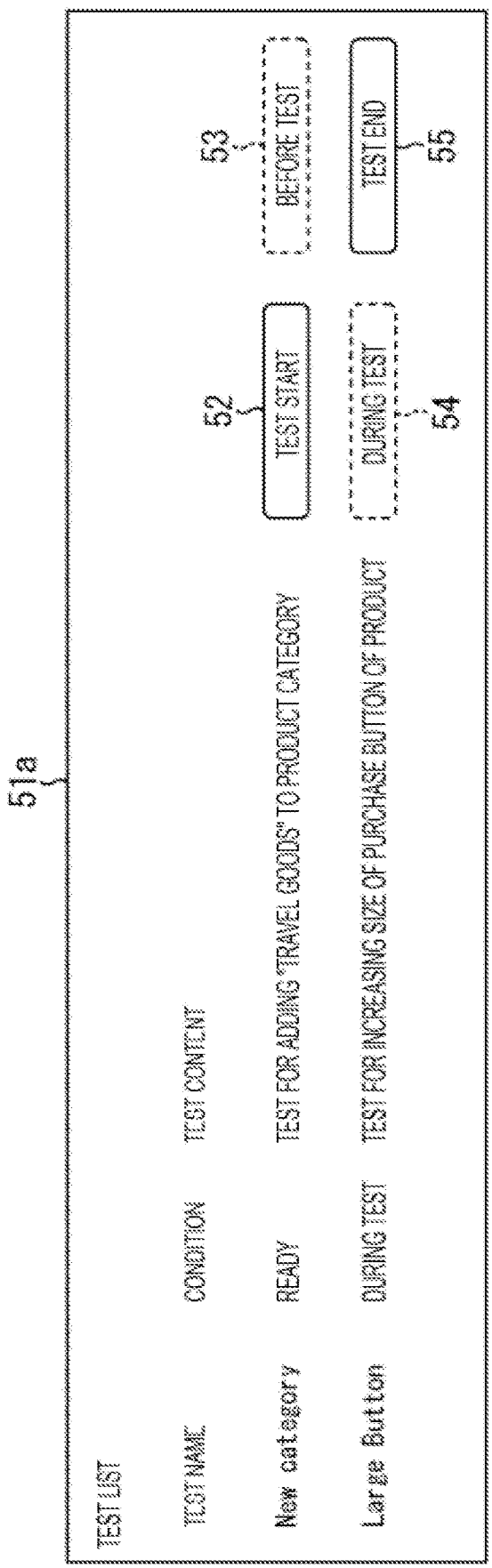
FIG. 9 is a diagram of an example of a test list screen.

In FIG. 9, an example of a test list screen indicating a list of the A/B tests conducted by the information processing system 11 is illustrated.

In a test list screen 51a illustrated in FIG. 9, a test name "New category" of an A/B test for adding a new category and a test name "Large Button" of an A/B test for changing the size of the purchase button of the web page are listed.

Furthermore, the state of the test name "New category" is "ready", and it is indicated that a test content of the A/B test is a "test for adding "travel goods" to product category". Similarly, the state of the test name "Large Button" is "under test", and it is indicated that the test content of the A/B test is a "test for increasing the size of the purchase button of the product".

Then, in the test list screen 51a, a test start button 52 and a test end button 53 with respect to the test name "New category" are displayed. The test start button 52 is a GUI which is operated when the A/B test of the test name "New category" is started. Note that, since the state of the A/B test of the test name "New category" is ready, the test end button 53 cannot be operated, and "before the test" is displayed in the test end button 53.

Similarly, in the test list screen 51a, a test start button 54 and a test end button 55 with respect to the test name of "Large Button" are displayed. The test end button 55 is a GUI which is operated when the A/B test of the test name "Large Button" is terminated. Note that, since the state of the A/B test of the test name "Large Button" is during the test, the test start button 54 cannot be operated, and "during the test" is displayed in the test start button 54.

With respect to such a test list screen 51a, the developer can start the A/B test of the test name "New category" by operating the test start button 52 and terminate the A/B test of the test name "Large Button" by operating the test end button 55.

Figure 10:
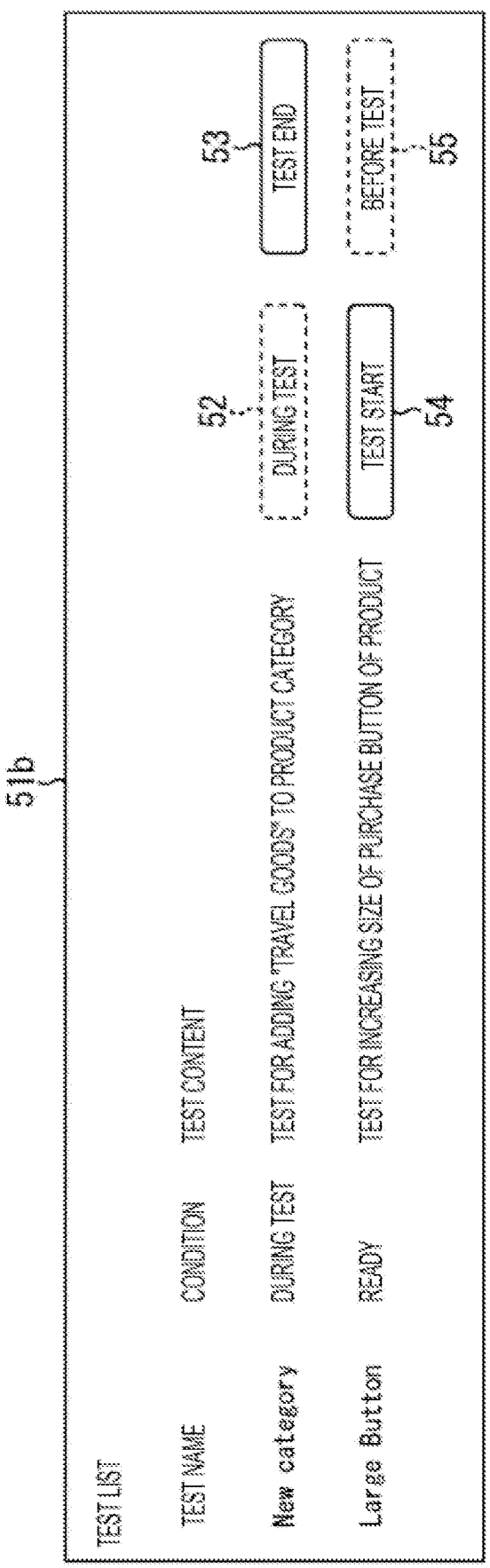
FIG. 10 is a diagram of an example of the test list screen.

Then, when the test start button 52 is operated, as illustrated in the test list screen 51b in FIG. 10, the test start button 52 cannot be selected, and "during the test" is displayed in the test start button 52. Furthermore, at the same time, the test end button 53 for terminating the A/B test of the test name "New category" can be operated.

Similarly, when the test end button 55 is operated, as illustrated in the test list screen 51*b* in FIG. 10, the test end button 55 cannot be selected, and "before the test" is displayed in the test end button 55. Furthermore, at the same time, the test start button 54 for starting the A/B test of the test name "Large Button" can be operated.

With respect to such a test list screen 51*b*, the developer can terminate the A/B test of the test name "New category" by operating the test end button 53 and start the A/B test of the test name "Large Button" by operating the test start button 54.

Figure 11:
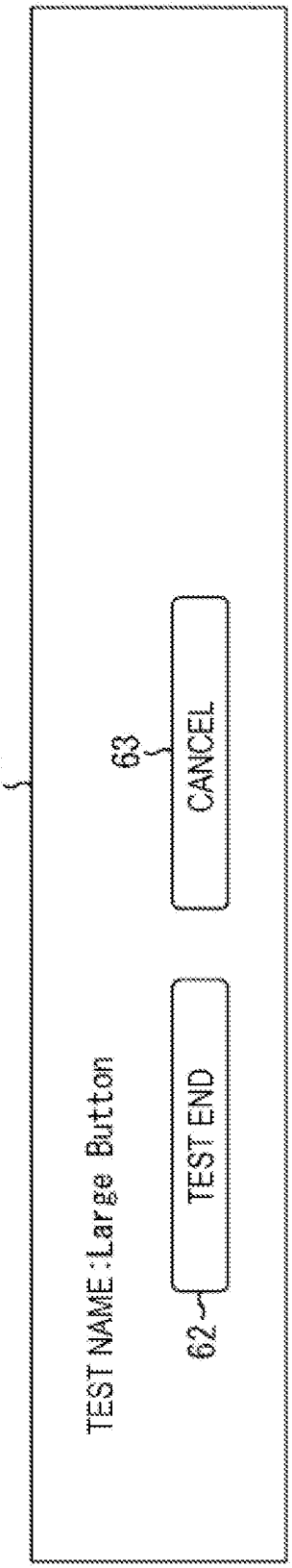
FIG. 11 is a diagram of an example of a test completion screen at the time when the A/B test that does not affect the database is terminated.

In FIG. 11, an example of a test completion screen is illustrated which is displayed at the time when the A/B test that does not affect the database is terminated by the information processing system 11.

For example, when the A/B test that does not affect the database is terminated, a test end button 62 and a cancel button 63 are displayed in a test completion screen 61*a*. The test end button 62 is a GUI which is operated when the A/B test that does not affect the database is terminated. The cancel button 63 is a GUI which is operated when the termination of the A/B test that does not affect the database is cancelled.

Figure 12:
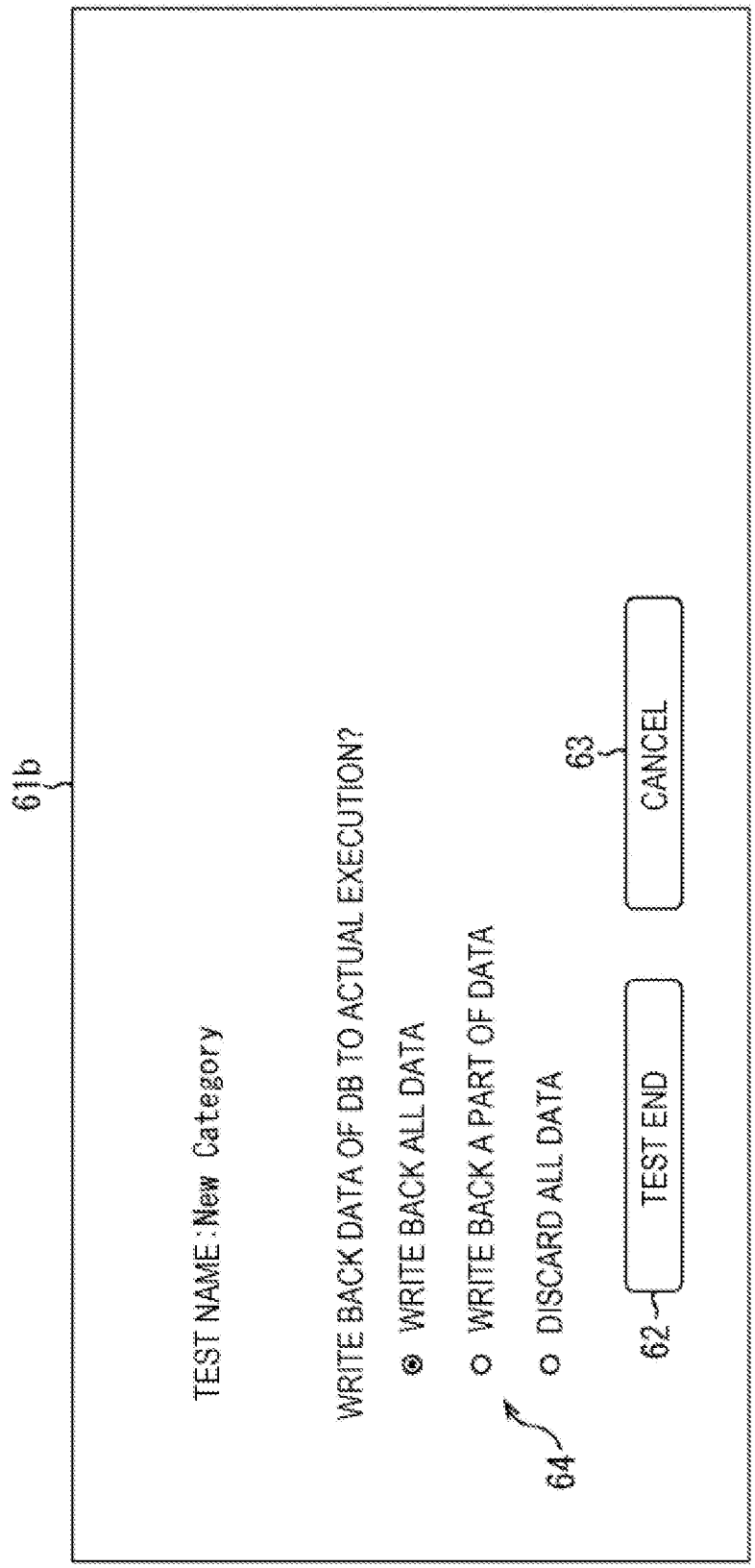
FIG. 12 is a diagram of an example of a test completion screen at the time when the A/B test that affects the database is terminated.

In FIG. 12, an example of a test completion screen is illustrated which is displayed at the time when the A/B test that affects the database is terminated by the information processing system 11.

For example, when the A/B test that affects the database is terminated, a radio button 64 is displayed in a test completion screen 61*b*, in addition to the test end button 62 and the cancel button 63.

The radio button 64 is a GUI which is used to select processing executed at the time when the test database 34 is deleted. For example, with the radio button 64, the developer can instruct to select any one of processing for writing back all the data of the test database 34 to the database for actual execution 33, processing for entirely writing back a part of the data of the test database 34 to the database for actual execution 33, and processing for discarding all the data of the test database 34.

For example, in the test completion screen 61*b* illustrated in FIG. 12, the radio button 64 indicates a state in which the processing for writing back all the data of the test database 34 to the database for actual execution 33 is selected.

Figure 13:
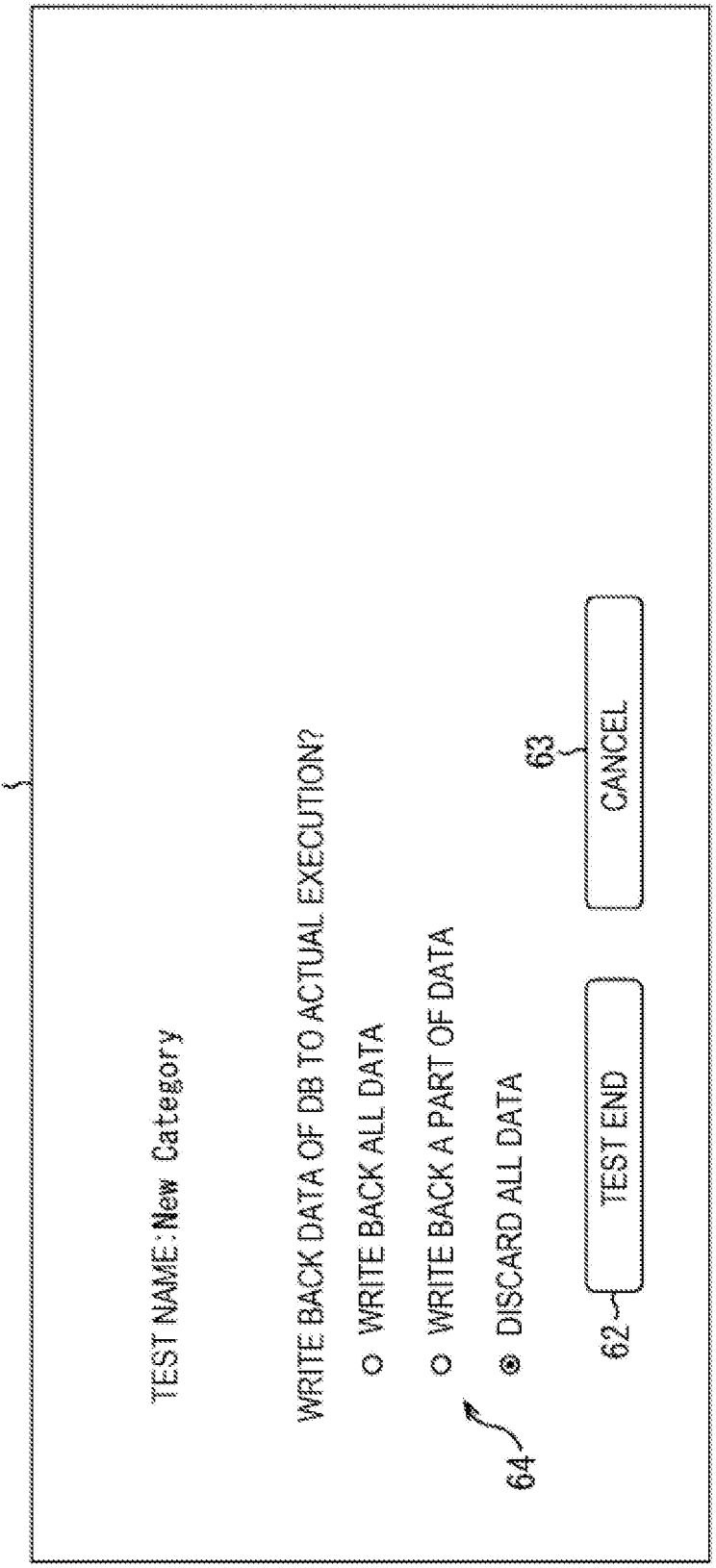
FIG. 13 is a diagram of an example of the test completion screen at the time when the A/B test that affects the database is terminated.

Furthermore, in a test completion screen 61*c* illustrated in FIG. 13, the radio button 64 indicates a state where the processing for discarding all the data of the test database 34 is selected.

Then, when the processing for entirely writing back a part of the test database 34 to the database for actual execution 33 is selected by the radio button 64, as illustrated in a test completion screen 61*d* in FIG. 14, a radio button 65 is displayed.

As illustrated in FIG. 14, the radio button 65 is a GUI which confirms a test result obtained by conducting the A/B test by the developer and selects the database to be written back to the database for actual execution 33. In the example in FIG. 14, a state is illustrated in which the database of the product is selected as the database to be written back to the database for actual execution 33.

In this way, with the information processing system 11, the developer can execute various inputs described above with reference to FIGS. 7 to 14 by using the screen displayed on the user interface 21.

<A/B Test that does not Affect Database>

An example in which the A/B test that does not affect the database is conducted by the information processing system 11 will be described.

For example, in a case where the size of the purchase button on the web page is changed as the A/B test that does not affect the database, an implementer implements a feature branch in which the size of the purchase button is changed and notifies the developer of a branch name and that the A/B test does not affect the database.

In response to the notification, the developer inputs a target (90% of users and the like) of the A/B test in which the size of the purchase button has been changed and a test definition in which a branch name to be tested (feature 1 and the like) is written to the test definition input part 42 by using the test definition input screen 41*a* illustrated in FIG. 7. Then, the developer operates the radio button 43 to select that the A/B test does not affect the database, then, performs an operation for pressing the test start button 44.

In the developer terminal 12, the user interface 21 obtains a content input by the developer, the test conduct instruct unit 22 registers the test definition to the test management database 14, and the deployment unit 23 deploys the test implementation server 32 with a configuration in which the database for actual execution 33 is shared. With this operation, as illustrated in FIG. 3 described above, in the database server construction unit 13, a configuration in which the implementation server 31 and the test implementation server 32 share the database for actual execution 33 is constructed.

Then, the deployment of the test implementation server 32 is completed, and the A/B test is started at the same time. Thereafter, the proxy server 16 distributes the request from the client terminal 15 to the implementation server 31 and the test implementation server 32 according to the test definition registered in the test management database 14.

In this way, the A/B test that does not affect the database is conducted by the information processing system 11, and the developer confirms whether an excellent test result is obtained or not, and then, can terminate the test.

In other words, in a case where the test for changing the size of the purchase button on the web page is conducted, the user interface 21 displays the test list screen 51*a* in FIG. 9, and the developer can terminate the A/B test by performing an operation for pressing the test end button 55.

<A/B Test that Affects Database>

An example will be described in which the A/B test that affects the database is conducted by the information processing system 11 by using the contents of the databases illustrated in FIGS. 15 and 18.

For example, as illustrated in FIG. 15, the EC service holds a user, a product, a category of the product, a user's purchase history, and a preference (preference vector of category for each user) in a database as data having a state.

In A of FIG. 15, a user database for managing information such as a user identification (ID) and a name is illustrated, and in B of FIG. 15, a product database for managing information of products handled in the EC service is illustrated. In C of FIG. 15, a category database for managing a list of categories of products is illustrated, and in D of FIG. 15, a purchase history database for managing user's purchase history is illustrated. In E of FIG. 15, a preference database for managing a preference vector for each user to recommend a product for the user is illustrated.

Then, in a case where an A/B test for adding a new category is conducted as the A/B test that affects the database, for example, specific values are added to the product database and the category database.

Conventionally, as illustrated in C of FIG. 15, in the database for actual execution 33, a list of the categories of the products is managed according to properties of products such as foods, shoes, and books, for example. On the other hand, as illustrated in C of FIG. 16, an A/B test is conducted as adding a trend to the test database 34 as a new category indicating a product which has been recently sold well. With this operation, only the product which has been recently sold well can be found on the basis of the item of the trend, and an A/B test for observing a change in a Key Performance Indicator (KPI) such as sales and a product click rate can be conducted.

Furthermore, as illustrated in B of FIG. 16, a trend category (Category ID: 4) is added to a product which has been sold well (Product ID: 2) in the product database. With this operation, for example, a function for retrieving only the products which are sold well from the product database can be added.

Then, in a case where a new category is added as the A/B test that affects the database, the implementer implements a feature branch to which a new category is added. Then, the implementer notifies the developer that the branch name and that the test affect the product database and the category database.

In response to this notification, the developer inputs a target (30% of users and the like) of a test to which a new category is added and a test definition in which a branch name to be tested (feature 1 and the like) is written to the test definition input part 42 by using the test definition input screen 41*b* illustrated in FIG. 8. Then, the developer selects that the A/B test affects the database by operating the radio button 43 and inputs that the test affects the product database and the category database, and then, performs an operation for pressing the test start button 44.

In the developer terminal 12, the user interface 21 obtains a content input by the developer, the test conduct instruction unit 22 registers the test definition to the test management database 14, and the deployment unit 23 deploys the test implementation server 32 with a configuration in which the test database 34 is duplicated. With this configuration, as illustrated in FIG. 4 described above, in the database server construction unit 13, a configuration is constructed in which the implementation server 31 uses the database for actual execution 33 and the test implementation s 32 uses the test database 34.

Then, the deployment of the test implementation server 32 is completed, and the A/B test is started at the same time. Thereafter, the proxy server 16 distributes the request from the client terminal 15 to the implementation server 31 and the test implementation server 32 according to the test definition registered in the test management database 14. For example, the developer continues to conduct the A/B test until a difference is caused between the database for actual execution 33 and the test database 34.

In the A/B test, as illustrated in FIG. 15, the database for actual execution 33 has a configuration in which the foods, the shoes, and the books are registered in the category database. Furthermore, in the test database 34, the trend is added to the category database as illustrated in FIG. 16. Then, in a case where an excellent test result is obtained in the A/B test conducted by the information processing system 11, the developer can terminate the A/B test by taking the data of the test database 34 into the database for actual execution 33.

In other words, in a case where the test for adding a new category is conducted, the user interface 21 displays the test list screen 51*b* in FIG. 10, and the developer can terminate the test by performing an operation for pressing the test end button 53. Subsequently, the user interface 21 displays the test completion screen 61*b* (FIG. 12), and the developer selects the processing for writing back all the data of the test database 34 to the database for actual execution 33 by using the radio button 64. After that, the developer operates the test end button 62.

After this operation, in the information processing system 11, the test implementation server 32 is disconnected from the proxy server 16 (FIG. 5), and the proxy server 16 stops transfer of the request to the test implementation server 32 and transfers the request only to the implementation server 31. Then, in the information processing system 11, to take necessary data into the implementation server 31 (FIG. 6), the content of the test database 34 is written back (sync) to the database for actual execution 33. With this operation, in the database for actual execution 33, the trend is added to the category database, and thereafter, the category of the trend is valid for all users.

On the other hand, in a case where an excellent test result cannot be obtained in the A/B test conducted by the information processing system 11, the developer can terminate the A/B test without taking the data of the test database 34 into the database for actual execution 33.

In other words, similarly to the above, the developer can terminate the A/B test by performing an operation for pressing the test end button 53 on the test list screen 51*b* in FIG. 10. Subsequently, the user interface 21 displays the test completion screen 61*c* (FIG. 13), and the developer selects the processing for discarding all the data of the test database 34 by using the radio button 64. After that, the developer operates the test end button 62.

As a result, in the information processing system 11, the trend is deleted from the category database in the test database 34, and after that, the category of the trend is invalid for all users.

Here, as the A/B test that affects the database, an A/B test for analyzing preference for each user and changing an algorithm to recommend a product for each user will be described.

For example, the information processing system 11 holds the algorithm to recommend a product, and it is expected to increase sales by improving the algorithm. For example, in the preference database, an n-dimensional vector w indicating weighting of preference of a product category for each individual is registered. Each dimension of the vector indicates an amount of interest in for each category of the product such as a food, shoes, and a book.

In the database for actual execution 33, a model is used in which a learning rate is attenuated with the number of times of trials to converge the weight on the basis of the hypothesis such that user's interest does not change for a long period. On the other hand, in the test database 34, a model is used in which the weight is not attenuated on the basis of the hypothesis such that user's interest changes in time series.

Therefore, with the algorithm of the implementation server 31 using the database for actual execution 33, recommendation of products in categories of the products which have been recently purchased is not often made. On the other hand, with the algorithm of the test implementation server 32 using the test database 34, the products which have been recently purchased by the user are heavily weighted. Accordingly, a case of the A/B test for observing the change in the KPI such as the sales and the product click rate will be considered.

Such an A/B test is different from the A/B test for adding the new category, and the data of the test database 34 is not changed in advance. That is, since the algorithm of the implementation server 31 is different from the algorithm of the test implementation server 32, as illustrated in FIGS. 17 and 18, the values in the preference database are separated from each other as conducting the A/B test.

In this way, the value in the preference database of the database for actual execution 33 illustrated in FIG. 17 is changed from the value in the preference database of the test database 34 illustrated in FIG. 18 by the algorithm.

The implementer changes a new algorithm and implements a feature branch, and notifies the developer of the branch name and that the preference database is affected. In response to this notification, the developer inputs a target (30% of users and the like) of a test to which a new category is added and a test definition in which a branch name to be tested (feature 1 and the like) is written to the test definition input part 42 by using a test definition input screen 41. Then, the developer selects that the A/B test affects the database by operating the radio button 43 and inputs that the test affects the preference database, and then, performs an operation for pressing the test start button 44.

In the developer terminal 12, the user interface 21 obtains a content input by the developer, the test conduct instruction unit 22 registers the test definition to the test management database 14, and the deployment unit 23 deploys the test implementation server 32 with a configuration in which the test database 34 is duplicated. With this configuration, as illustrated in FIG. 4 described above, in the database server construction unit 13, a configuration is constructed in which the implementation server 31 uses the database for actual execution 33 and the test implementation server 32 uses the test database 34.

Then, the deployment of the test implementation server 32 is completed, and the A/B test is started at the same time. Thereafter, the proxy server 16 distributes the request from the client terminal 15 to the implementation server 31 and the test implementation server 32 according to the test definition registered in the test management database 14. For example, the developer continues to conduct the A/B test until a difference is caused between the database for actual execution 33 and the test database 34. Thereafter, the A/B test is terminated with a procedure similar to that described above.

For example, the case where the excellent test result is obtained in the A/B test is a time when the user often purchases the product when the product in the similar category to the product which has been recently purchased by the user is recommended. At this time, since a weight w learned for the user is valid, the data of the test database 34 is written back to the database for actual execution 33, and the service is continued.

On the other hand, the case where the excellent test result cannot be obtained in the A/B test is a case where the user does not show an interest in the product in the similar category to the product which has been recently purchased by the user and selects the product in the category which has been frequently purchased by the user. At this time, since is it understood that recommendation using the weight w learned for the user does not work well, the data of the test database 34 is discarded. Then, after the weight w is returned to the weight which has been learned before, the service is continued.

<Processing Executed by Information Processing System 11>

Figure 19:
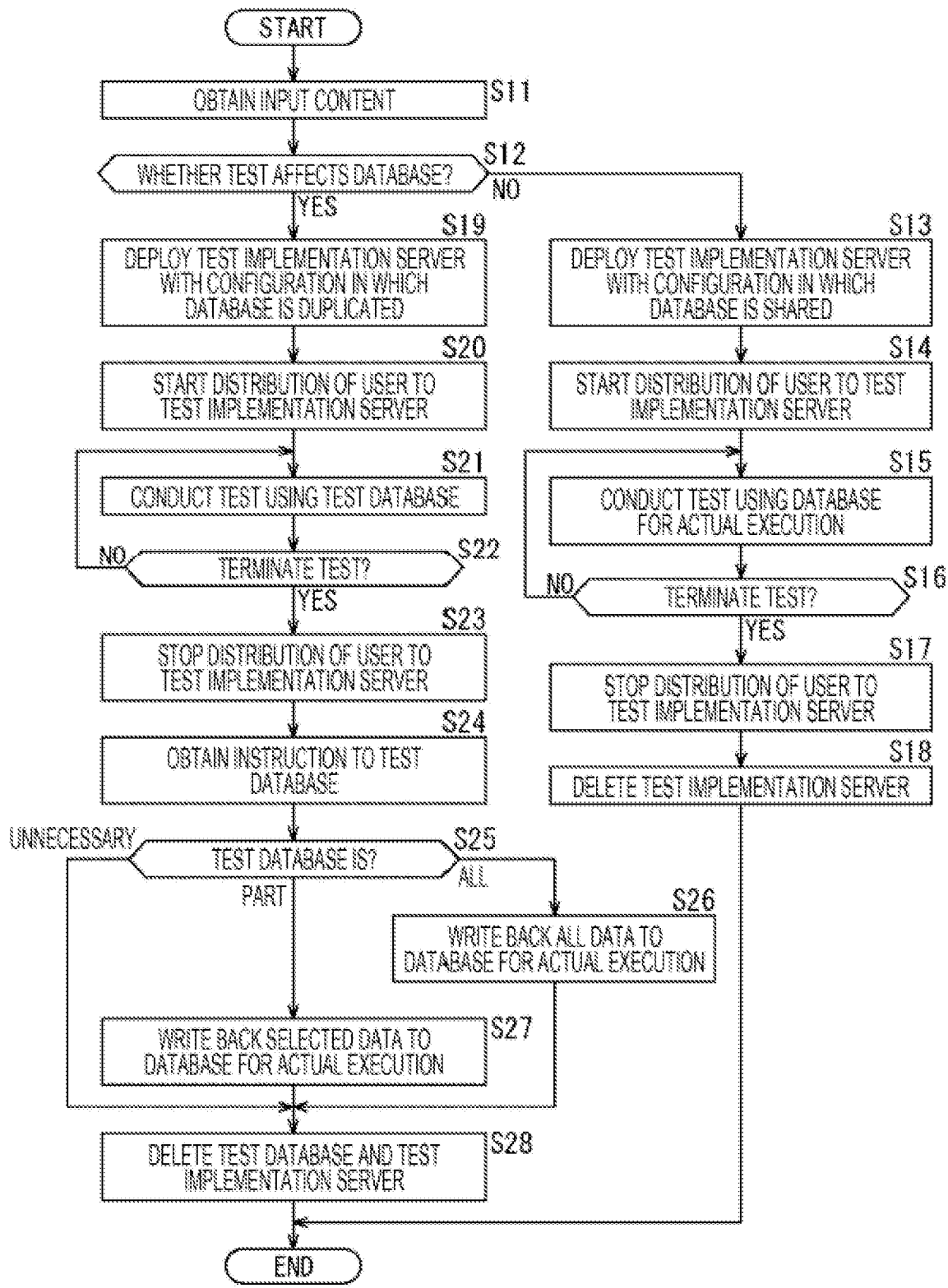
FIG. 19 is a flowchart for explaining processing for conducting the A/B test by the information processing system.

With reference to the flowchart in FIG. 19, processing for conducting the A/B test by the information processing system 11 will be described. For example, when the implementer requests the developer to conduct the A/B test and notifies the developer of information necessary for conducting the A/B test, the processing is started.

In step S11, the user interface 21 displays the test definition input screen 41 and makes the developer input the test definition. Then, the developer inputs the test definition by using the test definition input part 42 and inputs selection whether or not the A/B test affects the database by using the radio button 43, and then, operates the test start button 44. In response to this operation, the user interface 21 obtains an input content input by the developer with respect to the test definition input screen 41.

In step S12, the user interface 21 determines whether or not the A/B test conducted by the information processing system 11 affects the database on the basis of the input content obtained in step S1.

In a case where the user interface 21 has determined in step S12 that the A/B test conducted by the information processing system 11 does not affect the database, in other words, in a case where the A/B test that does not affect the database is conducted, the processing proceeds to step S13.

In step S13, the user interface 21 instructs the deployment unit 23 to conduct the A/B test that does not affect the database, and the deployment unit 23 deploys the test implementation server 32 with the configuration in which the database for actual execution 33 is shared. With this operation, as illustrated in FIG. 3, in the database server construction unit 13, a configuration in which the implementation server 31 and the test implementation server 32 share the database for actual execution 33 is constructed.

In step S14, the user interface 21 supplies the test definition obtained in step S11 to the test conduct instruction unit 22 and instructs the test conduct instruction unit 22 to start the test. With this instruction, the test conduct instruction unit 22 registers the test definition to the test management database 14, and the proxy server 16 starts to distribute the request of the user to the test implementation server 32 according to the test definition.

In step S15, in the information processing system 11, each of the implementation server 31 and the test implementation server 32 conducts the A/B test using the database for actual execution 33 in response to the request of the user distributed to the test implementation server 32. For example, the implementation server 31 transmits a web page on which a normal-sized purchase button is displayed, and the test implementation server 32 transmits a web page on which a purchase button larger than the normal button is displayed.

In step S16, the user interface 21 determines whether or not to terminate the A/B test conducted by the information processing system 11. For example, the developer confirms the test result such as a difference between accesses caused by the implementation server 31 and the test implementation server 32, and performs an operation for pressing the test end button 55 in FIG. 9 when terminating the A/B test. With this operation, the user interface 21 determines to terminate the A/B test conducted by the information processing system 11.

In a case where the user interface 21 has determined in step S16 that the test is not terminated, the processing returns to step S15, and the A/B test is continued. On the other hand, in a case where the user interface 21 has determined to terminate the test in step S16, the processing proceeds to step S17.

In step S17, the user interface 21 instructs the test conduct instruction unit 22 to terminate the A/B test. With this instruction, the test conduct instruction unit 22 deletes the test definition registered in the test management database 14, and the proxy server 16 stops the distribution of the request of the user to the test implementation server 32.

In step S18, the user interface 21 instructs the deployment unit 23 to terminate the A/B test, and the deployment unit 23 deletes the test implementation server 32 from the implementation server 31.

On the other hand, in a case where the user interface 21 has determined in step S12 that the A/B test conducted by the information processing system 11 affects the database, in other words, the A/B test that affects the database is conducted, the processing proceeds to step S19.

In step S19, the user interface 21 instructs the deployment unit 23 to conduct the A/B test that affects the database, and the deployment unit 23 deploys the test implementation server 32 with the configuration in which the test database 34 is duplicated. With this operation, as illustrated in FIG. 4, in the database server construction unit 13, the test database 34 is provided by duplicating the database for actual execution 33. Then, in the database server construction unit 13, a configuration is constructed in which the implementation server 31 uses the database for actual execution 33 and the test implementation server 32 uses the test database 34.

In steps S20 to S23, processing similar to those in step S14 to S17 is executed. In this case, in step S21, the test implementation server 32 conducts the test by using the test database 34. For example, the implementation server 31 transmits a web page on the basis of the category database with no trend, and the test implementation server 32 transmits a web page on the basis of a category database including the trend.

In step S24, the user interface 21 obtains an instruction relative to the data of the test database 34 on the basis of an input by the developer on a test completion screen 61.

In step S25, the user interface 21 determines whether all the data of the test database 34 is required, a part of the data of the test database 34 is required, or all the data is unnecessary according to the instruction obtained in step S24.

In a case where the user interface 21 has determined in step 325 that all the data of the test database 34 is required, the processing proceeds to step S26. In step 326, the deployment unit 23 executes processing for writing back all the data of the test database 34 to the database for actual execution 33.

On the other hand, in a case where the user interface 21 has determined in step S25 that a part of the data of the test database 34 is required, the processing proceeds to step 327. In step S27, for example, the deployment unit 23 executes processing for writing back a part of the data specified by using the radio button 65 as described above with reference to FIG. 14 to the database for actual execution 33.

Furthermore, in a case where the user interface 21 has determined in step S25 that all the data of the test database 34 is not unnecessary and after the processing in steps S26 and S27, the processing proceeds to step S28.

In step S28, the deployment unit 23 deletes the test database 34 and the test implementation server 32 from the implementation server 31.

Then, after the processing in steps S18 and S28, the processing is terminated.

As described above, in the information processing system 11, when the A/B test is started, the developer specifies the data that is affected by the A/B test (in other words, data to which item different from database for actual execution 33 may be registered) by using the test definition input screen 41b in FIG. 8, and the test database 34 is duplicated. Thereafter, in response to the request from the user, data in different states are held by updating the database for actual execution 33 and the test database 34.

Then, in the information processing system 11, when the A/B test is terminated, whether to write back all the data of the test database 34 updated in the A/B test, to write back a part of the data of the test database 34, or to discard all the data of the test database 34 can be selected. With this selection, only necessary data can be extracted from the test results of the A/B test.

Furthermore, the information processing system 11 can conduct the A/B test that affects the database by making the developer specifying the data which is affected by the A/B test, specifying the data to be written back, and the like without making the developer aware the database for actual execution 33 and the test database 34 constructed in the database server construction unit 13.

Note that, in the information processing system 11, when the A/B test is started, it is possible to specify a time when the A/B test is terminated and to specify the data to be written back. Furthermore, information processing executed by the information processing system 11 is not limited to the A/B test, and for example, rolling update for updating a plurality of servers in turn can be applied or the like.

Note that it is not necessary for the processing described above with reference to the flowcharts to be necessarily executed in time series in an order described in the flowchart, and the processing described above includes processing which is executed in parallel or processing which is individually executed (for example, parallel processing or processing by object).

Furthermore, the program may be executed by a single CPU, and may be distributively processed by a plurality of CPUs.

Furthermore, here, the system indicates a whole device including a plurality of devices.

Furthermore, the above-mentioned series of processing (information processing method) can be executed by hardware and software. In a case where the software executes the series of processing, a program included in the software is installed from a program recording media, in which the program has been recorded, to a computer installed in a dedicated hardware or, for example, a general-purpose personal computer or the like which can perform various functions by installing various programs.

Figure 20:
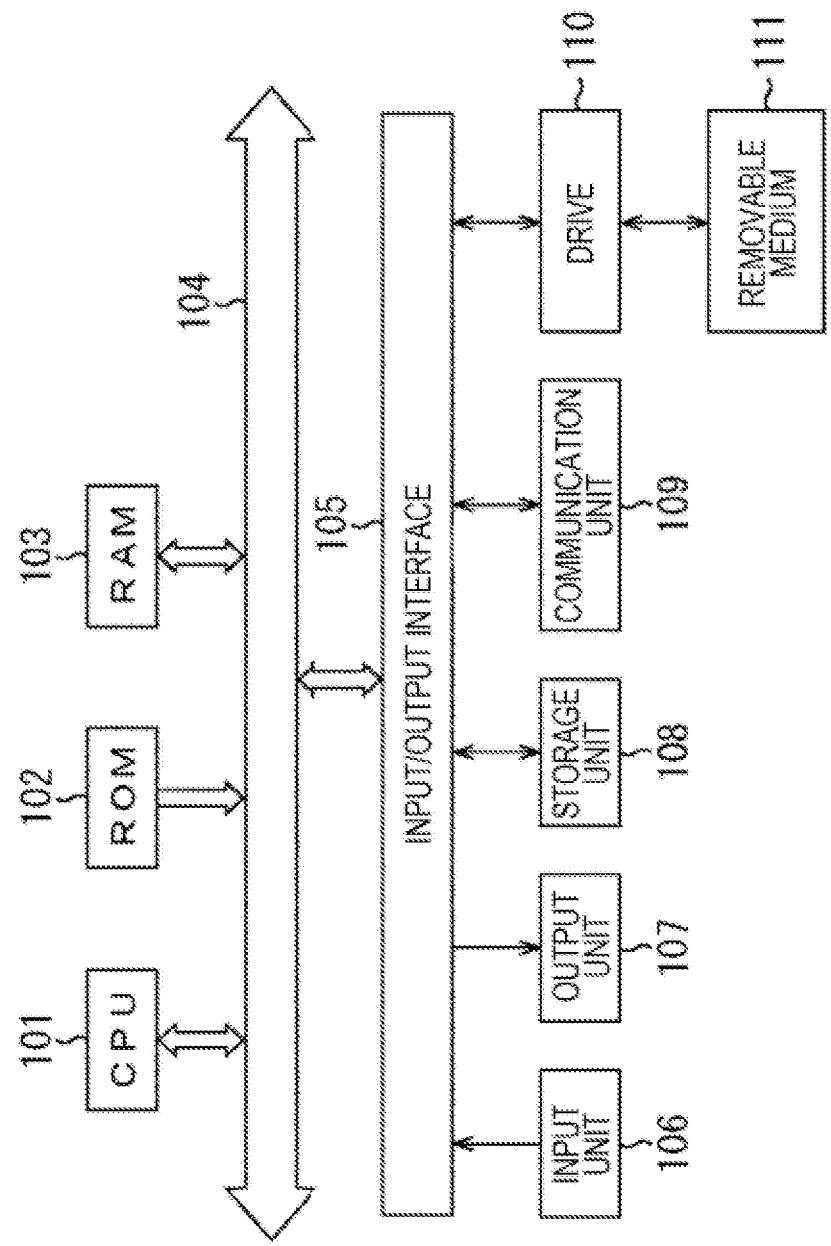
FIG. 20 is a block diagram of an exemplary configuration of an embodiment of a computer to which the present technology is applied.

FIG. 20 is a block diagram of an exemplary configuration of hardware of the computer for executing the above-mentioned series of processing by the program.

In a computer, a central processing unit (CPU) 101, a read only memory (ROM) 102, and a random access memory (RAM) 103 are connected to each other with a bus 104.

In addition, an input/output interface 105 is connected to the bus 104. The input/output interface 105 is connected to an input unit 106 including a keyboard, a mouse, a microphone, and the like, an output unit 107 including a display, a speaker, and the like, a storage unit 108 including a hard disk, a nonvolatile memory, and the like, a communication unit 109 including a network interface and the like, a drive 110 which drives a removable medium 111 such as a magnetic disk, an optical disk, a magneto-optical disk, or a semiconductor memory.

In the computer configured as described above, the CPU 101 loads, for example, the program stored in the storage unit 108 to the RAM 103 via the input/output interface 105 and the bus 104 and executes the program so that the above-mentioned series of processing is executed.

The program executed by the computer (CPU 101) is provided, for example, by recording the program to the removable medium 111 which is a package medium such as a magnetic disk (including flexible disk), an optical disk (compact disc-read only memory (CD-ROM), a digital versatile disc (DVD), and the like), a magneto-optical disk, or a semiconductor memory or via a wired or wireless transmission medium such as a local area network, the Internet, or a digital satellite broadcast.

Then, the program can be installed to the storage unit 108 via the input/output interface 105 by mounting the removable medium 111 in the drive 110. Furthermore, the program can be received by the communication unit 109 via the wired or wireless transmission medium and installed to the storage unit 108. In addition, the program can be previously installed to the ROM 102 and the storage unit 108.

Note that, the present technology can have the configuration below.

(1) An information processing apparatus including:
a duplication processing unit configured to execute processing for creating a test database by duplicating a database in a case where it is instructed to conduct an A/B test that affects the database; and
a write-back processing unit configured to execute processing for writing back data of the test database to the database in a case where it is instructed to terminate the A/B test.

(2) The information processing apparatus according to (1), in which
when the A/B test is terminated, the write-back processing unit executes processing for writing back all of a plurality of pieces of data registered in the test database to the database.

(3) The information processing apparatus according to (1) or (2), in which
when the A/B test is terminated, the write-back processing unit executes processing for writing back a specified part of data of the plurality of pieces of data registered in the test database to the database.

(4) The information processing apparatus according to (3), further including:
a user interface processing unit configured to execute processing for presenting a user interface to specify a part of data to be written back to the database.

(5) The information processing apparatus according to (4), in which
the user interface processing unit executes processing for presenting a user interface for specifying whether or not to conduct a test that affects a database.

(6) The information processing apparatus according to any one of (1) to (5), further including:
a server arrangement processing unit configured to execute processing for arranging a test implementation server using the test database created by the duplication processing unit, in addition to an implementation server using the database, in a case where it is instructed to conduct a test that affects the database.

(7) The information processing apparatus according to (6), in which
the server arrangement processing unit executes processing for arranging the test implementation server so as to share the database with the implementation server in a case where it is instructed to conduct a test that does not affect the database.

(8) The information processing apparatus according to (6), in which
a new item which is not registered in the database is registered in the test database,
the implementation server provides a service by using the database which does not include the new item, and the test implementation server provides a service by using the test database including the new item.

(9) An information processing method including:
executing processing for creating a test database by duplicating a database in a case where it is instructed to conduct an A/B test that affects the database; and
executing processing for writing back data of the test database to the database in a case where it is instructed to terminate the A/B test.

(10) A program for causing a computer to execute information processing, including:
a step of executing processing for creating a test database by duplicating a database in a case where it is instructed to conduct an A/B test that affects the database; and
a step of executing processing for writing back data of the test database to the database in a case where it is instructed to terminate the A/B test.

(11) An information processing system including:
a duplication processing unit configured to execute processing for creating a test database by duplicating a database in a case where it is instructed to conduct an A/B test that affects the database;
a write-back processing unit configured to execute processing for writing back data of the test database to the database in a case where it is instructed to terminate the A/B test;
an implementation server configured to provide a service by using the database; and
a test implementation server configured to provide a service by using the test database.

Note that, the present embodiment is not limited to the embodiment described above and can be variously changed without departing from the scope of the present disclosure.

REFERENCE SIGNS LIST 11 information processing system
12 developer terminal
13 database server construction unit
14 test management database
15 client terminal
16 proxy server
21 user interface
22 test conduct instruction unit
23 deployment unit
31 implementation server
32 test implementation server
33 database for actual execution
34 test database

The invention claimed is:
1. An A/B test system comprising:
developer interface communicatively coupled to a test deployment module, and the test deployment module communicatively coupled to a database server;
wherein the database server includes a first database and a second database, wherein the first database stores data that is executed during an operation initiated at a client terminal, the operation causing accessing of the first database, and the second database is used during a time when the test deployment module runs an A/B test;
wherein, upon a start of the A/B test, the test deployment module duplicates the first database to the second database;
wherein the developer interface receives an indication of a first developer submitted input indicating that the A/B test affects the first database; and wherein the developer interface receives a second developer submitted input indicating a test definition, wherein the test definition is registered at a test management database that is communicatively coupled to the test deployment module; and the test deployment module deploys, to a test implementation server, a configuration in accordance with the test definition causing a proxy server to distribute a request from the client terminal to an implementation server and to the test implementation server in accordance with the test definition; and when the A/B test ends, in accordance with the indication of the first developer submitted input indicating that the A/B test affects the first database, the test deployment module writes back contents of the second database to the first database.

2. The A/B test system of claim 1, where the contents of the second database that are written back to the first database are all of a plurality of pieces of data registered in the second database.

3. The A/B test system of claim 1, where the contents of the second database that are written back to the first database are a specified part of data of all of a plurality of pieces of data registered in the second database.

4. The A/B test system of claim 3, wherein the developer interface receives an indication of a specified part of data to be written back to the first database.

5. An information processing method comprising:

storing data that is executed during an operation initiated at a client terminal at a first database, the operation causing accessing of the first database;

using a second database during a time when an A/B test is run by a test deployment module;

upon a start of the A/B test, duplicating the first database to the second database;

receiving a first developer submitted input indicating that the A/B test affects the first database; and receiving a second developer submitted input indicating a test definition;

registering the test definition at a test management database that is communicatively coupled to the test deployment module; and deploying, to a test implementation server, a configuration in accordance with the test definition causing a proxy server to distribute a request from the client terminal to an implementation server and to the test implementation server in accordance with the test definition; and when the A/B test ends, in accordance with the indication of the first developer submitted input indicating that the A/B test affects the first database, writing back contents of the second database to the first database.

6. A non-transitory computer-readable medium including computer program instructions, wherein the computer program instructions when executed by a computer, cause the computer to perform a method, the method comprising:

storing data that is executed during an operation initiated at a client terminal at a first database, the operation causing accessing of the first database;

using a second database during a time when an A/B test is run by a test deployment module;

upon a start of the A/B test, duplicating the first database to the second database;

receiving a first developer submitted input indicating that the A/B test affects the first database; and receiving a second developer submitted input indicating a test definition;

registering the test definition at a test management database that is communicatively coupled to the test deployment module; and deploying, to a test implementation server, a configuration in accordance with the test definition causing a proxy server to distribute a request from the client terminal to an implementation server and to the test implementation server in accordance with the test definition; and when the A/B test ends, in accordance with the indication of the first developer submitted input indicating that the A/B test affects the first database, writing back contents of the second database to the first database.

* * * * *